United States Patent
Gogniat et al.

(10) Patent No.: US 8,141,145 B2
(45) Date of Patent: Mar. 20, 2012

(54) METHOD TO CONTROL THE EXECUTION OF A PROGRAM BY A MICROCONTROLLER

(75) Inventors: Christophe Gogniat, Chavannes-près-Renens (CH); Michael John Hill, Coppet (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1160 days.

(21) Appl. No.: 11/984,274

(22) Filed: Nov. 15, 2007

(65) Prior Publication Data

US 2008/0120517 A1    May 22, 2008

(30) Foreign Application Priority Data

Nov. 16, 2006 (EP) ..................................... 06124175

(51) Int. Cl.
*G06F 21/00* (2006.01)
(52) U.S. Cl. .......................................... 726/17; 713/188
(58) Field of Classification Search .................... 726/16, 726/17, 21; 713/187–194
See application file for complete search history.

(56) References Cited

U.S. PATENT DOCUMENTS

| | | | | |
|---|---|---|---|---|
| 5,307,265 A | * | 4/1994 | Winans | .............................. 704/8 |
| 5,729,676 A | * | 3/1998 | Inoue | ............................... 714/38 |
| 6,823,507 B1 | | 11/2004 | Srinivasan et al. | |
| 2002/0138748 A1 | * | 9/2002 | Hung | .............................. 713/190 |
| 2003/0188231 A1 | | 10/2003 | Cronce | |
| 2006/0090063 A1 | * | 4/2006 | Theis | ............................ 712/239 |

FOREIGN PATENT DOCUMENTS

| | | |
|---|---|---|
| FR | 2 790 844 | 9/2000 |
| FR | 2 841 015 | 12/2003 |
| FR | 2 864 655 | 7/2005 |

* cited by examiner

*Primary Examiner* — Gilberto Barron, Jr.
*Assistant Examiner* — Malcolm Cribbs
(74) *Attorney, Agent, or Firm* — Harness, Dickey & Pierce, P.L.C.

(57) ABSTRACT

The aim of the present invention is to propose a method and a device with the aim of avoiding problems which could ensue following the de-synchronization of a program counter during the execution of a program.

This aim is achieved by a method for controlling the execution of a program involving separating the program into a number of blocks of instructions and adding an input control section and an output control section to each block. The control sections have conditions for entry to the block and conditions for exit from the block. This can be used to check the validity of the execution of a program by verifying the execution history of the program. Action can be taken in the case that any anomaly is found in the program execution compared to the expected execution.

11 Claims, 3 Drawing Sheets

METHOD TO CONTROL THE EXECUTION
OF A PROGRAM BY A MICROCONTROLLER

INTRODUCTION

The present invention concerns the field of microcontrollers, in particular the field of safeguarding the execution of a program by said microcontroller. More precisely, the invention intends to prevent that the disturbances allow the uncovering of confidential information contained in a memory of the microcontroller or that cooperate with the latter. In particular, this invention can be applied to a microprocessor security module used in the field of conditional access television.

BACKGROUND ART

It is well known that a program used by a microcontroller or a microprocessor is made up of a set of instructions, themselves made up of an operation code (opcode) and possibly of one or several operands. The first octet of an instruction ("opcode") plays an important role as it defines the function desired. According to the instruction, one or several octets will be necessary to form an instruction.

According to the type of processor, the size of an opcode can for example be 8, 12, 16 or 32 bits. An opcode can also be temporarily of a greater length.

As it is also known, the processor executes the instructions according to the value contained in a program counter.

When a processor is out of synchronisation, for example following a programming error or an external disturbance, it is possible for its program counter (PC) to indicate a position in the memory that is not an operation code, but rather an operand.

These disturbances can originate, for example, from micro-interruptions in the power supply, from voltage peaks on the connection bus, from hot or cold thermal shocks, from exposition to a magnetic field, from exposition to a laser light, from alpha particles, etc.

When this type of external disturbance is produced, which can be carried out voluntarily on the processor by an ill-intentioned individual for example, this interrupts the normal execution of one or several instructions. Through this type of disturbance, it is possible for an execution program to jump in a place not provided in this program. It is also possible that such a disturbance will change the content of the program counter in such a way that the further running of this program will take place without passing through the instructions provided previously and without passing through the associated access conditions. Therefore, this leads to a situation in which the verification and authentication procedures are not carried out or in which a communication port of the microcontroller module releases information that should not normally leave the security module or the microcontroller, such as for example keys, data and the program parts.

The French patent application FR-A-2 790 844 intends to resolve this problem by proposing a process and a device for controlling the running of a program. According to this process, it is verified that all the instructions comprised in a block of instructions that must be executed by a processor have been transmitted correctly. It is also verified that certain values obtained at the time of the execution of the instructions correspond to pre-registered values.

According to this process, the running of the entire program is not controlled. In particular, there is no verification of the instructions or the blocks of instructions that can be executed legitimately after the last instruction or the last block of instructions carried out.

BRIEF DESCRIPTION OF THE INVENTION

The aim of the present invention is to propose a method that will prevent the possible consequences related to a jump not envisaged at the time of the execution of a program. In particular, this method makes it possible to prevent confidential information from being released unduly.

This aim is achieved by a method to control the execution of a program by a microcontroller including at least a program memory and a processing unit, characterised in that it includes the following steps:

separation of said program into at least two blocks each containing a plurality of instructions that can be executed by said microcontroller;

integration into these blocks of at least one input control area (CTRL-E) containing input conditions, these input conditions including reference addresses corresponding to instructions from where the program is authorised to enter said input control area (CTRL-E);

integration into these blocks of at least one output control area (CTRL-S) containing output conditions;

at the time of the execution of the instructions of said program memorised in a given block, implementation of verification tests of the adequacy between the effective running of the program and the input and/or of output conditions; and implementation of countermeasures if the verification tests indicate an inadequacy between the effective running of the program and the input and/or output conditions.

In the process of the invention, the memory containing the program that can be executed is separated into blocks, these blocks being independent and each having at least two control areas. One of these control areas defines the conditions that the program must fulfil in order to exit this block and execute instructions contained in another block and to which locations the program can jump. Another control area contains the list of the addresses from which it is possible to enter the block concerned, as well as possibly the conditions to be fulfilled in order to be able to execute the instructions contained in this block. Another optional control area can impose a control of the running of the program inside a block.

In the present invention, the passage from one block to another is obligatorily carried out by means of control areas. In this way, if the program jumps unexpectedly without passing through at least one of the control areas, it will automatically be stopped or other measures can be taken. Likewise, if the program jumps from one block to another without this corresponding to the rules provided, it is possible to take measures such as stopping the program, for example. The only way to prevent the blocking of the program or to avoid the countermeasures is to respect the rules of passage from one block to another.

BRIEF DESCRIPTION OF THE DRAWINGS

The invention will be better understood thanks to the following detailed description that refers to the enclosed drawings, given as non-limitative examples, in which.

DETAILED DESCRIPTION OF THE INVENTION

Figure 1:
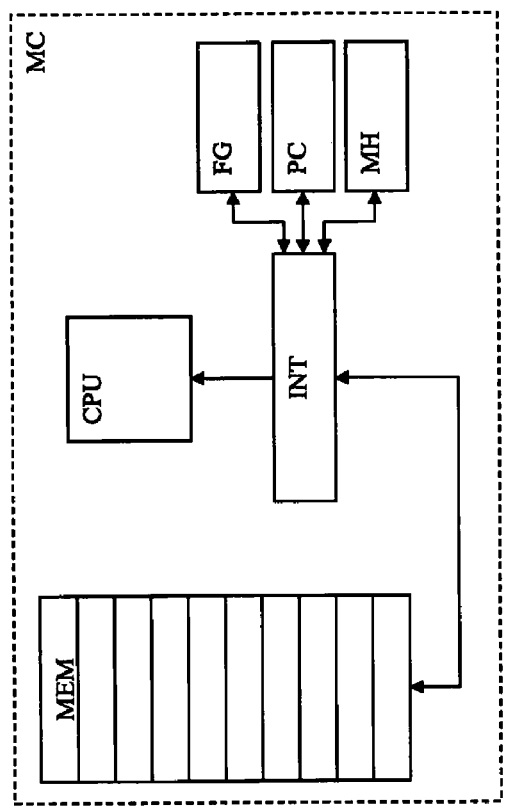
FIG. 1 schematically illustrates the elements used to implement the process of this invention.

FIG. 1 schematically represents a microcontroller MC including in particular a program memory MEM, a processing unit CPU, a program counter PC and an interface INT. This microcontroller also includes a history memory MH whose function is described below.

The program memory MEM contains the whole executable program and possibly areas not used. This memory can be made up of different types of support such as, in particular RAM, DRAM, ROM, EPROM, Flash.

The interface INT of the microcontroller MP is in particular responsible for reading the instructions contained in the memory according to the program counter PC. This reading runs according to the indications detailed below.

The program counter PC is responsible for memorising the address of the next instruction to be processed.

In a normal execution of a conventional program according to the prior art, it is possible to consider that two situation types exist at the time of the execution of an instruction:

it is executed just after the previous one;
it is executed following a jump.

In the first case, the program counter PC is increased automatically after the previous instruction has been processed. We are in continuous mode.

In the second case, the program counter PC is loaded with a value that can originate from several sources, for example a jump, a subroutine call, a conditional jump or an interrupt entry.

In the process of the invention, the program as memorised in the program memory of the microcontroller is separated into blocks. In the embodiment disclosed in FIG. 2, these blocks all have a fixed and identical size. This size can differ from one application to another, but in the embodiment chosen, it cannot be modified once it has been defined. Each of these blocks includes a certain number of instructions, represented by the lines INST. Each block also includes two control areas wherein one is placed at the start of the block, and the other is placed at the end of the block in this embodiment. It should be noted that the location of the control blocks may be different in other embodiments.

In this Figure, the interface INT is represented as a set of switches, one switch for each program block. These switches preferably take the form of hardware and illustrate schematically the connection between the processing unit of the microcontroller and the execution program blocks. The closed switch pointing to the upper block of FIG. 2 indicates that the content of this block can be used in order to be executed by the processing unit or in other words, the processing unit has access to the content of this block. This is called "active block". The open switches pointing to the other blocks, called inactive blocks, indicate that these others blocks or their content are not accessible and that the instructions that they contain cannot thus be executed by the processing unit.

With respect to the active block, namely that which is in communication with the processing unit by means of the interface, once the verification tests have been carried out in the input control area and passed successfully, the instructions are executed in a conventional way inside the block. An instruction register (not represented) contains the instruction during processing. The program counter PC memorises the address of the next instruction to be processed.

The history memory MH contains at least the address of the last instruction processed in the previous block. The function of this history memory MH is explained in more detail below.

From the moment at which an instruction situated outside the active block must be executed, the program must pass through an output control area, called CTRL-S in the Figures, contained in this active block.

Figure 4B:
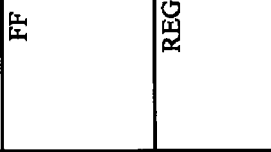
FIGS. 4a and 4b represent in detail, two control blocks such as those used in the embodiments in FIGS. 2 and 3.
Figure 4A:
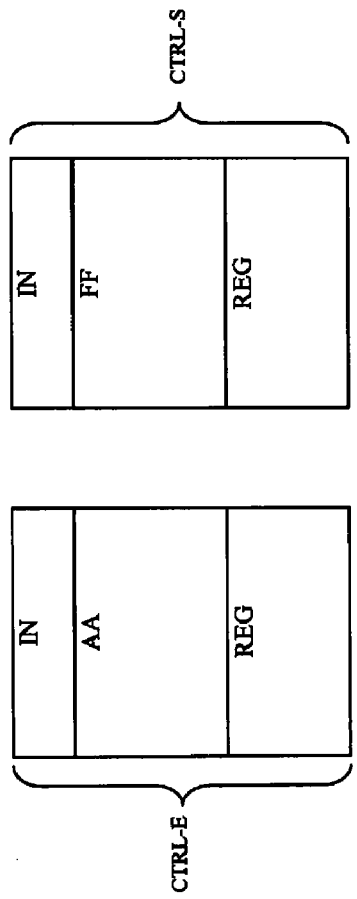

FIG. 4a shows in detail the content of an input control area CTRL-E. This area contains firstly an input address IN. It then contains conditions that must imperatively be fulfilled in order for the program to run normally. In particular, these conditions can comprise a list of reference addresses or authorised addresses AA. These reference addresses are the addresses from which it is possible to be sent in the active block in a way considered as legal, that is to say in accordance with the conventional running of the program. The conditions can also concern values that must be stored in a specific location such as a register or a memory. Other conditions could also be provided. The conditions can be defined at the time of the execution of the program.

FIG. 4b shows in detail the content of an output control area CTRL-S. This area contains conditions similar to the conditions of the input control area. In particular, they contain a list of reference addresses or authorised addresses FF, that are the addresses to which the program can be sent legally. The control area also contains an area containing the conditions related to the expected state of a memory or of one or several registers. These conditions can, as previously, be defined at the time of the execution of the program and can contain, for example, an indication related to the expected state of a memory or of one or several registers. The detailed use of these control areas is explained with reference to FIG. 6.

Figure 3:
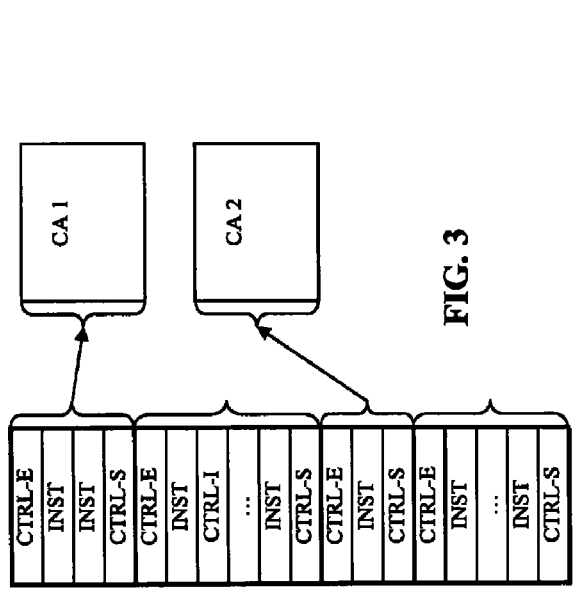
FIG. 3 represents a second embodiment of the invention.

In the embodiment disclosed in FIG. 3, the program is not separated into blocks of identical size, but rather into different sized blocks. The size of each block can be defined according to the logic content of the program. Therefore, the blocks can contain one or more subroutines, the size of the blocks thus depending on the size of the subroutines.

In the embodiment disclosed in FIG. 3, the blocks are not rendered active or inactive by means of switches, but rather they are placed in one or several cache memories. According to the embodiment disclosed in FIG. 3, two caches are used. One of the caches contains the active block and the other contains another block. This other block can be chosen as the block having the greatest probability of being the active block following the execution of the program.

It is also possible to use only one cache. In this case, when the program contained in the cache is executed and when a following active block must be used, the cache is loaded with the content of the new block.

The use of several caches makes it possible to avoid, insofar as the content of the second cache has been well chosen, to wait for the content of this new cache to be introduced. The microcontroller according to the invention is such that only the content of the active cache is accessible by means of the processing unit. If the cache is larger than the program block that is introduced into it, it is possible to place instructions in the cache allowing countermeasures to be taken. It is also possible to place countermeasures in a specific block.

Figure 2:
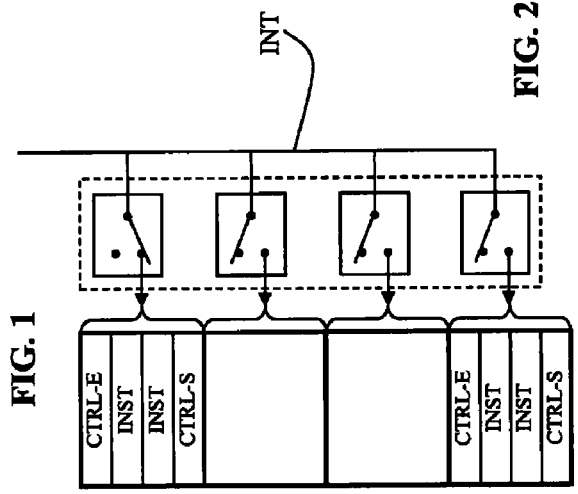
FIG. 2 represents a first embodiment of the invention.

Furthermore, FIG. 3 includes additional control elements with respect to the embodiment disclosed in FIG. 2. These elements are called CTRL-I and form an intermediate control area.

When the program runs conventionally, provision is made for it to reach this type of intermediate control area. This area contains instructions that can correspond to two different embodiments. According to one of the embodiments, the program is returned to the input control area CTRL-E. Verification tests of the adequacy between the effective running of the program and the expected running, as described below, are carried out. In the event that the program runs in correspondence to that which has been provided, the tests are successfully passed and the program can continue running normally.

In the event of the abnormal running of the program, following for example a disturbance, the input tests are carried out. If the conditions for the program to proceed are not fulfilled, countermeasures are taken. In this way, if a disturbance means that the program jumps in a place not provided in the block, an intermediate control can be carried out.

According to another embodiment, the microcontroller contains a flag FG. When the running of the program means that the tests provided in the input control area CTRL-E have been passed successfully, this flag is set to a preset value, for example 1.

In this embodiment, when the program reaches an intermediate control area CTRL-I, the value of the flag is verified. If this value is 1, it means that the input control conditions have already been verified. On the contrary, if this value is zero for example, this means that the input conditions have not yet been verified. In this case, countermeasures can be taken. In this embodiment, the passage through the output control area resets the value of the flag to a value different to the preset value, for example zero.

Figure 5:
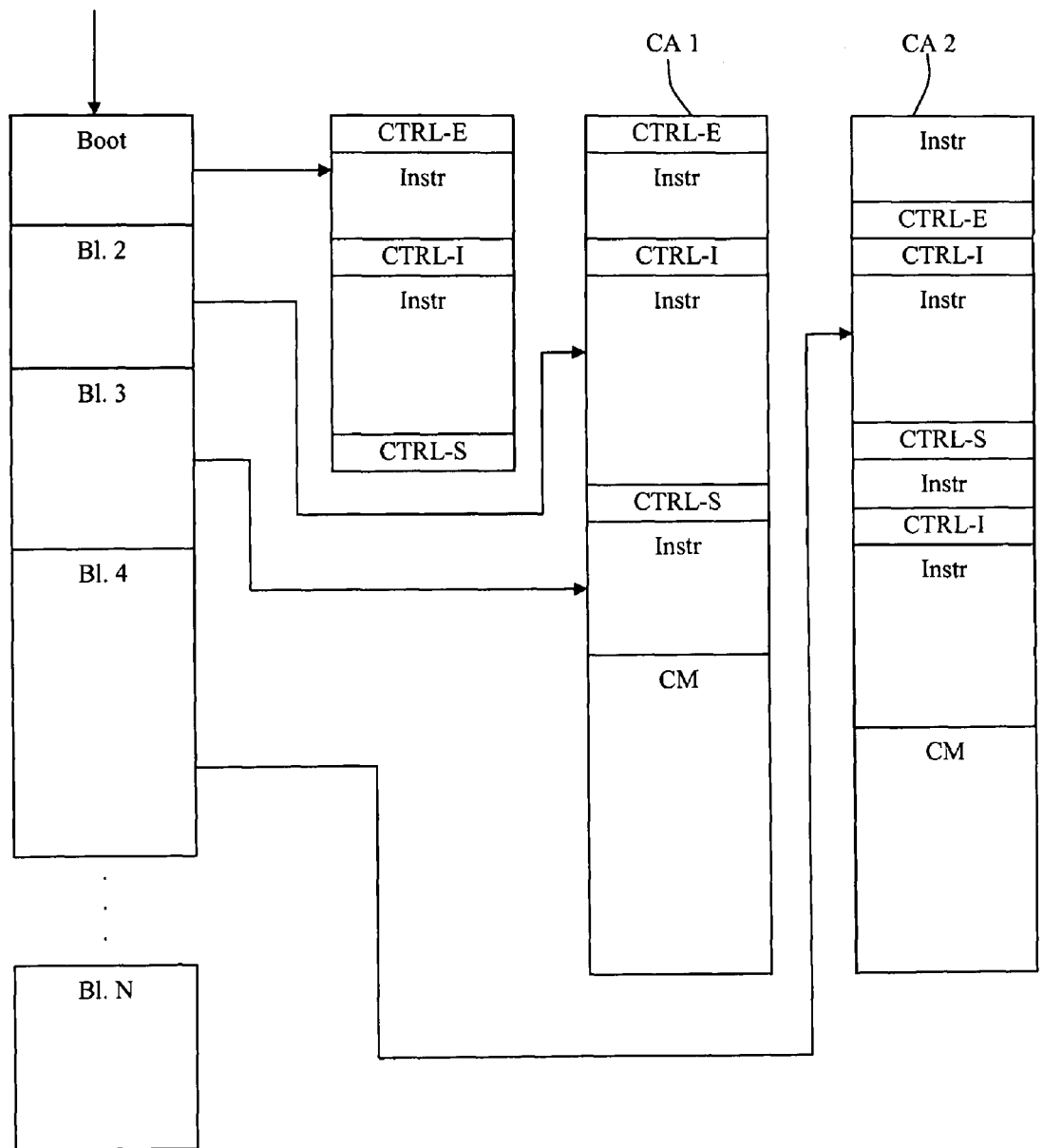
FIG. 5 schematically represents an operation program made up of different control blocks as well as the content of these blocks.

FIG. 5 shows on one hand the program as memorised in the memory of the microcontroller, and on the other hand the same program as separated into independent blocks at the time of its use in accordance with the process of the invention.

On the left side of the Figure, the program is placed continuously. It always starts by means of a start block (Boot), followed by different blocks (BL. 2, BL. 3, . . . , BL. N) which can correspond to routines, for example. On the right side of the Figure, the blocks are separated and illustrate the parts of the program that form the active block or that are introduced into the cache memories.

As an example, the Boot block contains an input control area CTRL-E, an intermediate control area CTRL-I, an output control area CTRL-S and instruction lines.

Blocks 2 and 3 are introduced into the same cache CA 1. The space available in the cache that is not occupied by the instruction lines or the control areas is occupied by countermeasures CM intended to act on the content of the cache in the event of incorrect use.

Block 4 is introduced into a cache CA2. The control areas are not placed at the start of the block, but can be placed anywhere in this block.

Figure 6:
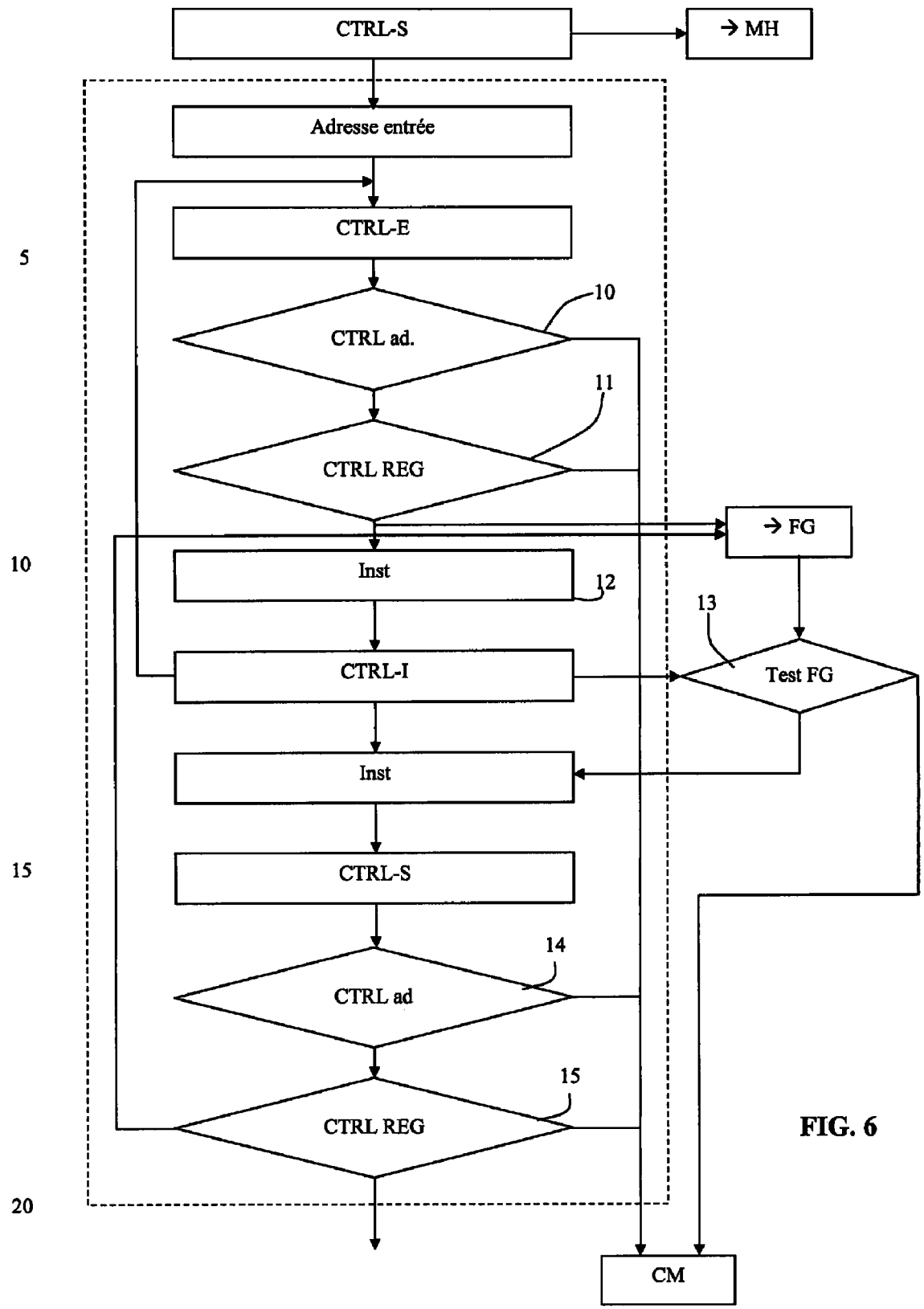
FIG. 6 represents in the form of a block diagram, the process of the invention.

FIG. 6 shows the running of the process according to this invention. In this process, two stages can be distinguished. The first stage concerns the start of the program after resetting to zero or after the initialisation of a device executing this program (this start currently being called boot) and the second stage concerns the subsequent running of the program. In the first stage, the program starts in an initial block, which can start at a fixed address. This block is referred to as BOOT in FIG. 5. This means that after a start or a reset to zero, the program always starts at the same address. In the second stage, the program starts at an address that depends on the processed block, comprising the start block. This address is fixed for each block, but of course it changes from one block to another. FIG. 6 describes the second stage more specifically.

During the control of the output of the last active block executed, the history memory MH has been fulfilled with the last address used.

The program thus starts at the input address of the block to be executed or active block, the latter beginning by means of the input control area CTRL-E. This one contains the authorised addresses of origin and the other conditions that must be fulfilled in order to gain authorisation to proceed with the running of the program. The address of origin is controlled during step 10 in FIG. 6. If the real address from which the program (address memorised in the history memory MH) originates forms part of the list of the accepted addresses AA (contained in the control area), the running of the program continues to the following step 11. On the contrary, if the real address, memorised in the history memory, does not form part of the authorised list, countermeasures are taken. These countermeasures, represented by CM in the Figure, can be the blocking of the program, the increase of an error counter, the elimination of data such as program instructions, memorised values or any other measure chosen by the computer programmer.

When the address is an authorised address, the program verifies, in step 11, if the conditions related to the state of the memories or registers are fulfilled. These conditions are indicated in the control area and define imperative characteristics that must be respected. If the imperative conditions are not fulfilled, countermeasures are taken. If the conditions are fulfilled, the running of the program can proceed in a conventional way, through the execution of the program code that is represented with the reference 12 in the Figure.

As previously indicated, the program can contain one or more intermediate control areas CTRL-I. In one of the illustrated embodiments, when the address of origin of the program and the access conditions have been verified and fulfilled, the flag FG is set to 1. When the program reaches an intermediate control area, a test is executed, during step 13, on the value of this flag. If this test indicates that the conditions have been fulfilled during the control in the control area (the value of the flag is 1 in our example), the program runs normally by following the instructions.

If on the contrary, it appears that the conditions have not been fulfilled (the value of the flag is 0 in this example), countermeasures CM are taken.

According to one variant, when the program reaches an intermediate control area CTRL-I, it can be sent back to the input control area CTRL-E where tests are executed again.

At the same time it is also possible to verify the flag and to carry out the input control area tests again.

When the program reaches the end of the active block or when a program instruction points towards an address situated outside this block, it is necessary to pass through this output control area CTRL-S before being authorised to carry out operations of another block. This output control area contains the list of the addresses from which the program can originate. If the program originates from an authorised address, which is verified during step 14, the program can also verify the other output conditions during step 15. These conditions can be of the same type as the input conditions, that is to say that they concern the state of memories or registers in particular. The output control area can also allow the list of the blocks in which the program can be found to be managed.

The program is then sent to a block that becomes the new active block and the flag FG is set to zero again. The input control process such as that explained above begins again for this new active block. Of course, if a violation of the rules is detected, whether during input or output, countermeasures can be taken, such as in particular the stopping of the program possibly with re-initialisation.

The passage through the output control area CTRL-S defines the following block that will have the role of the active block according to the current program and disconnect access to the other blocks. If the program attempts to jump in an unauthorised block, countermeasures can be taken. If the program is managed in a block according to the rules of the output control area, the new block will be the active block, the other blocks will be made inactive and the program will proceed conventionally.

With regard to the first stage of running of the program, the process of the invention is similar to that which has been previously explained, with the exception that the input can only be carried out through an address. At the time of the control in the input control area, only this address is valid and allows the subsequent execution of the program.

In the embodiments described above, only one block or cache is active, all the other blocks or caches being inactive. In practice, it is also possible to have several active blocks, for example two or three. In certain cases, this can allow the program to run faster.

The different embodiments described above can be combined together, without departing from the scope of the invention. In particular, the blocks may be of a size that is fixed or variable, identical or different. The interface could function like switches or use one or more cache memories.

The invention claimed is:

1. Method to control the execution of a program by a microcontroller including at least a program memory and a processing unit, wherein the method includes the following steps:
    separation of said program into at least two blocks each containing a plurality of instructions that can be executed by said microcontroller;
    integration into these blocks of at least one input control area containing input conditions, these input conditions including reference addresses corresponding to instructions from where the program is authorised to enter said input control area;
    integration into these blocks of at least one output control area containing output conditions;
    at the time of the execution of the instructions of said program memorised in a given block, implementation of verification tests of adequacy between effective running of the program and the input and/or of output conditions;
    implementation of countermeasures if the verification tests indicate an inadequacy between the effective running of the program and the input and/or output conditions; and
    when the program leaves a block in order to execute an instruction contained in another block, the program carries out, before leaving the block, the verification tests contained in said output control area and memorises, in a history memory, at least the address of the last instruction executed in the block.

2. Method to control the execution of a program according to claim 1, wherein the output conditions include reference addresses corresponding to instructions to which the program is authorised to go.

3. Method to control the execution of a program according to claim 1, wherein said input and/or output conditions include conditions relating to at least one value which must be contained in a specific location.

4. Method to control the execution of a program according to claim 1, wherein the countermeasures include prohibiting a subsequent execution of instructions memorised in a block other than that in which the last instruction has been executed.

5. Method to control the execution of a program according to claim 1, wherein at least one intermediate control area is also integrated into said block.

6. Method to control the execution of a program according to claim 1, wherein when the program starts an instruction in a different block to the block in which the previous instruction has been executed, it first carries out the verification tests contained in said input control area.

7. Method to control the execution of a program according to claim 1, wherein when the program starts an instruction in a different block to the block in which the previous instruction has been executed, it first carries out the verification tests contained in said input control area and wherein said tests of the input control area consist in comparing a real address of origin of the program with said reference addresses.

8. Method to control the execution of a program according to claim 1, wherein the microcontroller includes a flag, this flag being forced to a preset value when the verification tests of the input control area have been passed successfully.

9. Method to control the execution of a program according to claim 8, wherein the flag is forced to a value different to said preset value when the program leaves a block.

10. Method to control the execution of a program according to claim 5, wherein the microcontroller includes a flag, this flag being forced to a preset value when the verification tests of the input control area have been passed successfully, wherein when the program reaches an intermediate control area, the value of the flag is verified, and wherein if the value of the flag is equal to said preset value, the program proceeds.

11. Method to control the execution of a program according to claim 5, wherein when the program reaches an intermediate control area, it is returned to the input control area.

* * * * *